Feb. 6, 1940. P. E. BERTRAM 2,188,937
LINE TIGHTENER
Filed March 18, 1939 2 Sheets-Sheet 1

INVENTOR.
Paul E. Bertram
BY Stanley Hoods
ATTORNEY.

Feb. 6, 1940. P. E. BERTRAM 2,188,937
LINE TIGHTENER
Filed March 18, 1939 2 Sheets-Sheet 2
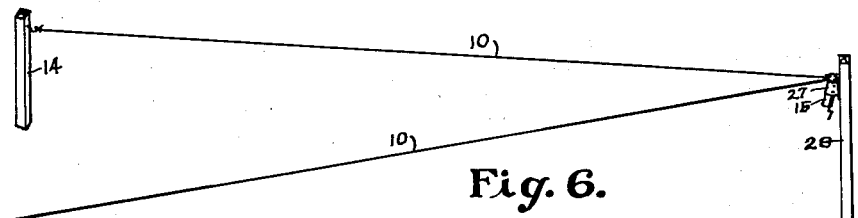
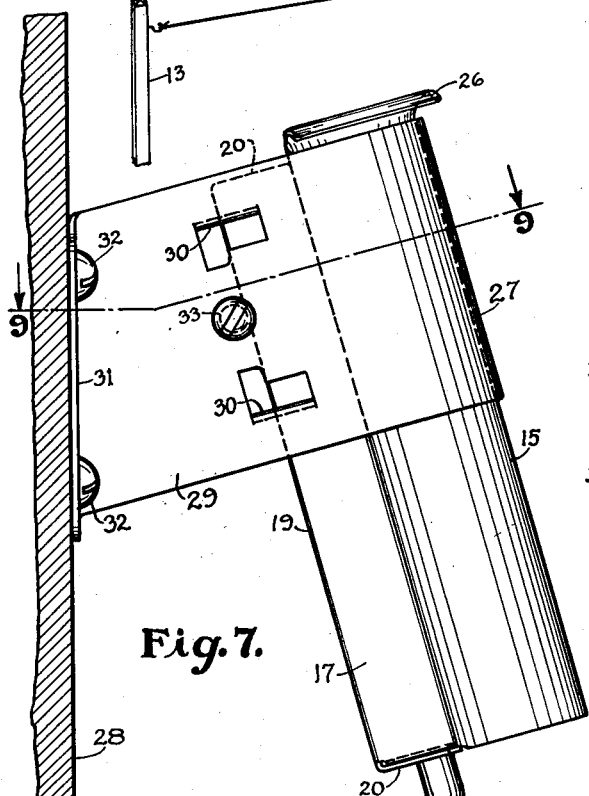
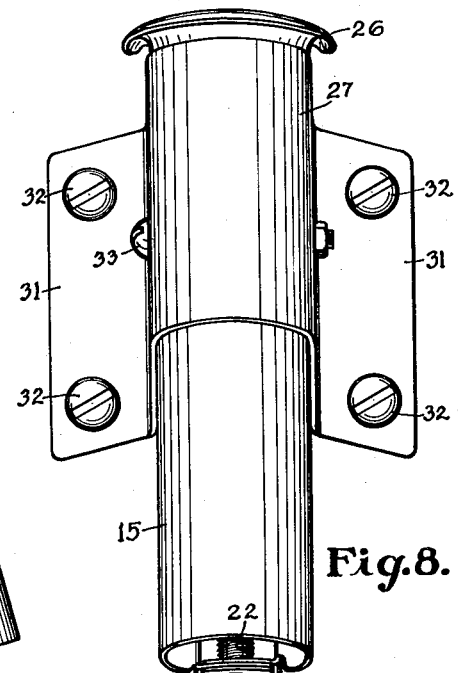
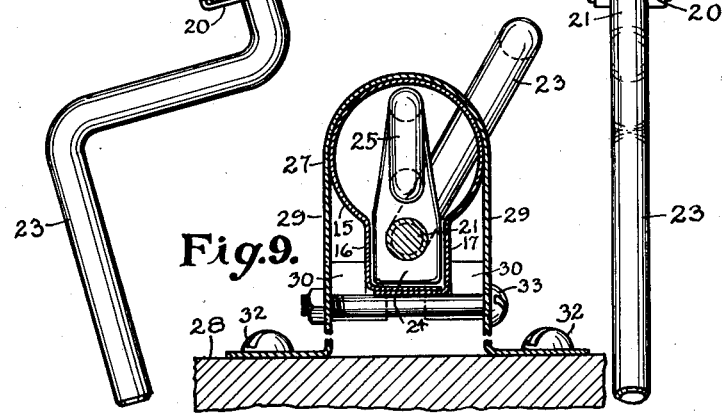
INVENTOR.
Paul E. Bertram
BY
ATTORNEY.

Patented Feb. 6, 1940

2,188,937

UNITED STATES PATENT OFFICE 2,188,937

LINE TIGHTENER

Paul E. Bertram, Crystal Lake, Ill.

Application March 18, 1939, Serial No. 262,719

1 Claim. (Cl. 254—67)

This invention relates to new and useful improvements in a line tightener and has for its object the provision of a device which will coact or cooperate with a suspended line of rope, cable or the like, such as a clothesline, whereby a portion of the line intermediate its suspended or anchored ends may be engaged and manipulated to control the slack, thereby making it unnecessary to disturb the end fastening of the line.

It is also an object of this invention to provide a device of this character which may be quickly and easily attached to a clothesline or the like.

An additional object of this invention is to provide a simple and inexpensive device and yet one which will be exceedingly effective for the purpose for which it is designed.

An additional object of this invention is to provide a bracket through which the present line tightener may be quickly and easily secured to a fixed support, such as a post.

With the above and other objects in view, as will be apparent, this invention consists in the construction, combination and arrangement of parts, all as hereinafter more fully described, claimed and illustrated in the accompanying drawings, wherein:

Fig. 6 is a perspective view of the device fixed to a post arranged intermediate the anchored ends of a clothesline.

Fig. 7 is an enlarged side elevation of the device shown in Fig. 6.

Fig. 8 is a similar view with the device shown in Fig. 6 turned through an angle of 90 degrees.

Fig. 9 is a transverse section taken on line 9—9 of Fig. 7.

Figure 1:
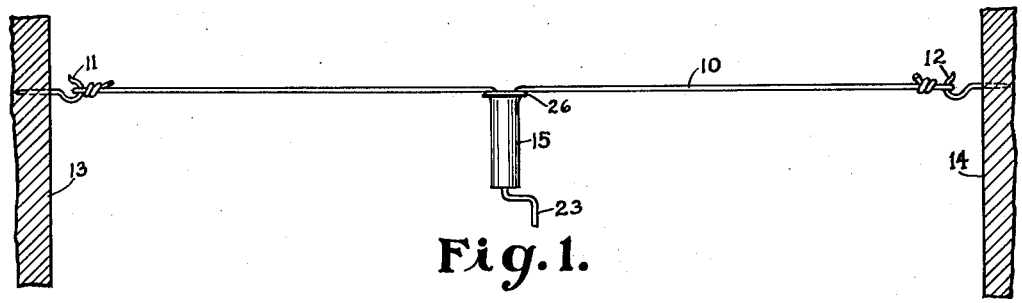
Fig. 1 is a perspective view of a line tightener embodying features of the present invention, and in operative relation to a line.
Figure 2:
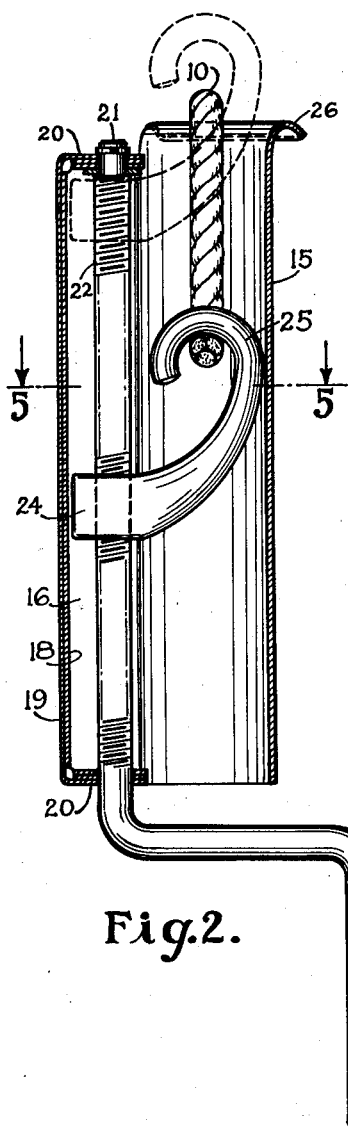
Fig. 2 is an enlarged longitudinal section of the device with parts in elevation.
Figure 3:
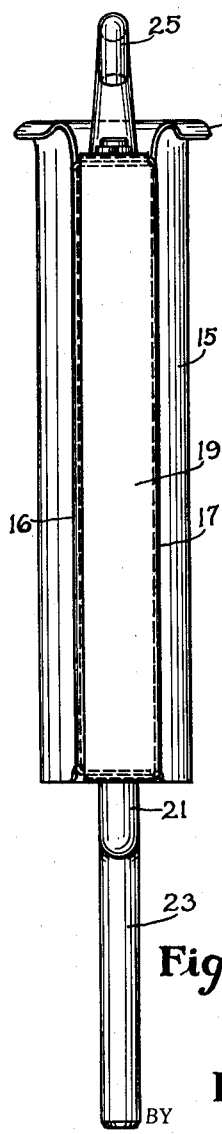
Fig. 3 is a rear view thereof.
Figure 4:
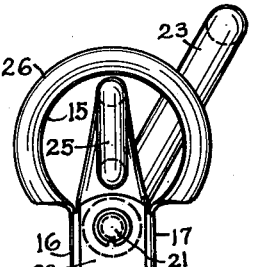
Fig. 4 is a top end elevational view thereof.
Figure 5:
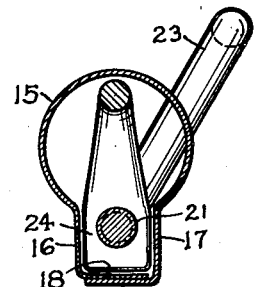
Fig. 5 is a transverse sectional view taken on line 5—5 of Fig. 2.

As already stated, the present invention is primarily designed for use in controlling the slack in a clothesline, but it is obvious that it may be applied to flexible lines of other uses with equal efficiency. Referring, therefore, to Fig. 1, the numeral 10 designates a conventional clothesline supported at its ends on hooks or the like 11 and 12, anchored to posts 13 and 14 respectively. The device with which this invention is chiefly concerned comprises a hollow body or casing 15 which can be conveniently made of sheet metal.

The casing 15 is shown as approximately round in cross section, but it is to be understood that this particular shape is not essential as it may be somewhat polygonal shaped if desired. The portions of the casing adjoining the meeting edges of the blank or sheet from which the casing 15 is formed, are turned outwardly to form relatively closely spaced parallel legs 16 and 17. The free edges of the legs are then preferably turned inwardly in overlapping relation and disposed in a plane at right angles to the plane of the legs, as at 18 and 19. The overlapped free edges 18 and 19 and the legs 16 and 17 thus define an inwardly opening channel of rectangular cross section extending lengthwise of the casing 15, and in outwardly offset relation to the latter. Ears 20 forming continuations or prolongations of the end edges of the legs 16 and 17 are bent inwardly in overlapping relation, said ears 20 being perforated to form bearings at opposite ends of the channel aforesaid for a rod 21, having a threaded portion 22. A crank arm 23 is provided at the projecting end of the rod 21 through which the latter may be rotated for a purpose to be discussed hereinafter.

Fitted on the threaded portion 22 of the rod 21 is an internally threaded member 24, whose external contour resembles a rectangular nut dimensioned to correspond with the cross section of the channel defined by the legs 16 and 17, aforesaid. Thus the member 24 is maintained in non-turning relation to the channel and is accordingly caused to travel lengthwise of the rod 21 when the latter is rotated. A rope engaging member or hook 25 extends from said member 24 in coaxial relation to the axis of the casing 15. Consequently, the hook 25 is adapted to be moved axially of the casing 15, and in opposite directions, under control of movement of the member 24 relative to the rod 21.

The mouth of the casing 15, which is that end thereof opposed to the end adjacent the crank 23, is preferably formed with a curved lip 26. The hook 25 is adapted to project outwardly beyond the outer limits of said lip 26. Therefore, the rope 10 while engaged by the hook 25 may ride over the surface of the lip 26 with minimum frictional resistance during operation of the crank 23 to turn the rod 21.

As shown in Figs. 1 to 5 inclusive, the device is portable and is thus adapted to be attached at any selected portion of the rope 10 intermediate its anchored ends. In operation, the crank 23 is turned to manipulate the member 24 to dispose the hook 25 in protruding relation to the mouth of the casing 15. With the elements in this position, the rope 10 is merely engaged by the hook 25 and the crank 23 turned to retract the member 24, causing the rope 10 to ride inwardly of the casing 15 against the lip 26. When the rope 10 has been pulled inwardly to sufficiently tighten the line, the device may be released and allowed to hang from the line 10, and the desired tension of the line will be maintained without any further attention to the tightener, since the friction of the threaded elements, to-wit the rod 21 and the member 24 is sufficient to automatically resist turning of the rod 21 and to maintain the parts in their selected adjusted position.

The device shown in Figs. 6 to 9 inclusive is similar to that shown in Figs. 1 to 5, except that it contemplates a fixed station or support on which the device may be mounted to engage the line intermediate its supported ends. As shown in Fig. 7, the casing 15 is embraced by a clamping strap 27, of any suitable material, adapted to support the casing 15 in downwardly and outwardly inclined relation to a post 28 to permit ample clearance for turning the crank 23. The wings 29 of the clamping strap 27, which is that portion thereof intermediate the post 28 and the body of the casing 15, are provided with L-shaped tongues 30 struck inwardly therefrom to engage the outer corners of the casing 15 defined by the legs 16 and 17, and the portions 18 and 19, thereby increasing the rigidity of the connection between said strap 27 and the casing 15. The postward edges of the wings 29 are flanged outwardly as at 31 and pierced to permit entry of screws or the like 32, through which the clamping strap 27 is connected to the post 28. A tie bolt 33 may also be used to maintain the tongues 30 of the strap 27 in fixed engaging relation to the casing 15, as described above.

As will be apparent, in using and operating the device shown in Figs. 6 to 9 inclusive, the rope 10 may be loosely trained through the hook 25 in connection with fastening of the ends of the rope 10 to the posts 13 and 14, after which the rope 10 may be tightened by operation of the crank 23, as described in connection with the device shown in Figs. 1 to 5 inclusive.

Having thus described the present invention, it should be understood that there may be modifications thereof and variations therein without departing from the spirit of the invention, or exceeding the scope of the appended claim.

What is claimed is:

In a line tightener, the combination with an elongated tubular casing having a circular open end with an outwardly curved lip extending circumferentially of said end, means formed integrally with said casing providing a pair of aligned bearings spaced lengthwise of said casing, a screw journalled in said bearings, a guideway between said bearings, a nut fitted on said screw and dimensioned to be held in non-turning relation to said guideway, and a line engaging member adapted to be moved axially of said casing under control of movement of said screw relative to said nut.

PAUL E. BERTRAM.